May 8, 1928.
J. H. CZOCK
PISTON
Filed March 4, 1927
1,669,290
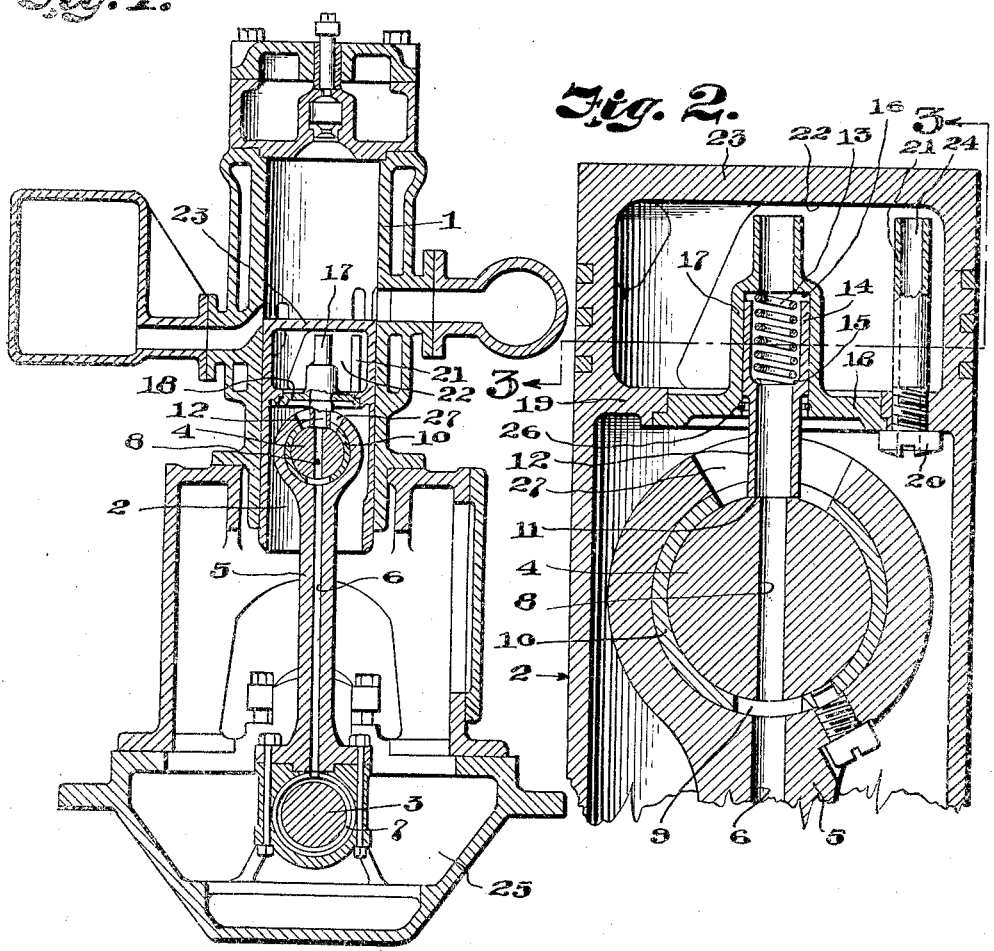
Jacob H. Czock.
INVENTOR Patented May 8, 1928.

1,669,290

UNITED STATES PATENT OFFICE.

JACOB H. CZOCK, OF SOMERVILLE, MASSACHUSETTS, ASSIGNOR TO WORTHINGTON PUMP AND MACHINERY CORPORATION, OF NEW YORK, N. Y., A CORPORATION OF VIRGINIA.

PISTON.

Application filed March 4, 1927. Serial No. 172,847.

This invention relates to pistons for internal combustion engines and more particularly to a construction to permit efficient oil cooling of the piston.

An object of the invention is to provide a piston structure for an internal combustion engine in which lubricating oil will be supplied to a chamber formed within the piston, through the connecting rod, the oil issuing into the chamber near the head and at the center, which part of the piston tends to overheat most rapidly, and especially suited to trunk pistons by reason of means for compensating for movement of the connecting rod without disrupting the flow of lubricating oil through the cooling chamber of the piston.

With these objects in view, the invention consists in various features of construction and combination of parts, which will be first described in connection with the accompanying drawings, showing a piston of the preferred form embodying the invention, and the features forming the invention will be specifically pointed out in the claims.

In the drawings—

Figure 1 is a section through an internal combustion engine of the Diesel type showing the improved piston used therewith.

Figure 2 is an enlarged fragmentary section through the piston.

Figure 3 is a cross section of the piston taken on the line 3—3 of Figure 2.

Referring more particularly to the drawings, an internal combustion engine of the Diesel type is illustrated, which includes the cylinder 1 in which the piston 2 reciprocates. The piston 2 is connected to the crankshaft 3 of the engine by the piston pin 4 and connecting rod 5, as is usual in such engine constructions. The connecting rod 5 is provided with an axial bore 6 which has communication at its lower end with the lubricating oil duct 7 in the crankshaft and at its upper end with a radial opening 8 in the piston pin 4 through a relatively large opening 9 in the bushing 10. The piston pin 4 is flattened as shown at 11 and a tube 12 rests against this flattened surface and is urged thereagainst by a spring 13 which is housed in the enlarged portion 14 of the tube 12 and bears against the shoulder 15 and the shoulder 16 which is formed in the sleeve 17. The sleeve 17 has an attaching flange 18 formed thereon which is attached to the flange 19 in the piston head by means of the heads 20 of the bolts 21. The sleeve 17 extends upwardly in the chamber 22 in the piston 2 to within a short distance of the inner surface of the top 23 of the piston so that the oil flowing through the transfer tube 12 and sleeve 17 will engage the inner surface of the top 23 of the piston 2 at the center of the same to provide maximum cooling at this point. The bolts 21 are drilled or hollow as shown at 24 and they extend upwardly within the chamber 22 to within a short distance of the inner surface of the top 23 of the piston and form overflows in the chamber to permit the oil to flow from the chamber 22 and fall back into the crankcase 25 of the engine. To prevent the transfer tube 12 from dropping out of its position when the piston pin 4 and connecting rod are removed or disconnected, a spring ring 26 is provided. To permit oscillation of the connecting rod 5 without interfering with the oil transfer tube 12, the upper part of the connecting rod 5 and the bushing 10 are cut away as shown at 27 thereby permitting oscillation of the connecting rod without interrupting the flow of the lubricating oil into the chamber 22.

The lubricating oil is forced upwardly through the bore 6 of the connecting rod, opening 9, bore 8, tube 12 and sleeve 17 into the chamber 22 where it cools the piston 2 and when the oil level within the chamber 22 reaches the upper ends of the hollow bolts 21 any further oil delivered to the chamber 22 will cause overflow of the oil through the bolts 21 from which the oil drops into the crankcase.

The spring 13 maintains bearing engagement between the tube 12 and piston pin 4 and there is no relative movement between these members, and consequently, no rupture of the oil flow.

From the foregoing description taken in connection with the accompanying drawing, it will be apparent that the present invention is particularly adaptable for use of lubricating oil as a cooling medium since leakage of the oil flowing through the bore 8 of the pin 4 will serve to lubricate the bearing surfaces of the pin and sleeve 10, and it will also be apparent that the invention is particularly adaptable for use in internal combustion engines of the trunk piston type.

It will be understood that the invention is not to be limited to the specific construction or arrangement of parts shown but that these may be modified widely within the invention defined by the claims.

What is claimed is:

1. In a piston cooling structure, a piston having a chamber for receiving oil therein, a piston pin provided with a passage for oil, a tube opening into said chamber, and means providing yielding contact between the piston pin and tube for maintaining an unbroken oil conduit into said chamber and an outlet from such chamber providing for a flow of oil through such chamber.

2. In a piston cooling structure, a piston provided with a chamber for receiving cooling oil, a piston pin, a connecting rod, said piston pin and connecting rod provided with aligning bores for the passage of oil, a bushing about the piston pin and provided with a relatively large opening to maintain communication between the bore of the connecting rod and the piston pin upon movement of the connecting rod relative to the piston, and means providing a conduit for guiding oil from the bore of the piston pin into said chamber.

3. In a piston cooling structure, a piston provided with a chamber for receiving cooling oil, a piston pin, a connecting rod, said piston pin and connecting rod provided with aligning bores for the passage of oil, a bushing about the piston pin and provided with a relatively large opening to maintain communication between the bores of the connecting rod and the piston pin upon movement of the connecting rod relative to the piston, a tube extending into said chamber, and a spring for urging one end of said tube into yieldable engagement with said piston pin to provide an unbroken conduit for cooling oil into said chamber.

4. In a piston cooling structure, a piston provided with a chamber for receiving cooling fluid, a piston pin, a connecting rod, said piston pin and connecting rod provided with aligning bores for the passage of cooling fluid, a tube extending into said chamber, a spring for urging one end of said tube into yieldable engagement with said piston pin to provide an unbroken conduit for cooling fluid into said chamber, a stationary sleeve about a portion of said yieldably mounted tube and extending upwardly within said chamber to within a short distance of the inner surface of the top of the piston.

5. In a piston cooling structure, a piston provided with a chamber for receiving cooling fluid, a piston pin, a connecting rod, said piston pin and connecting rod provided with aligning bores for the passage of cooling fluid, a bushing about the piston pin and provided with a relatively large opening to maintain communication between the bore of the connecting rod and the piston pin upon movement of the connecting rod relative to the piston, a tube extending into said chamber, a spring for urging one end of said tube into yieldable engagement with said piston pin to provide an unbroken conduit for cooling fluid into said chamber, a stationary sleeve about a portion of said yieldably mounted tube and extending upwardly within said chamber to within a short distance of the inner surface of the top of the piston, and a plurality of overflow members extending upwardly into said chamber to permit overflow of cooling fluid therefrom.

6. In a cooling piston structure, a piston provided with a chamber for receiving cooling fluid, a piston pin, a connecting rod, said piston pin and connecting rod provided with aligning bores for the passage of cooling fluid, a bushing about the piston pin and provided with a relatively large opening to maintain communication between the bore of the connecting rod and the piston pin upon movement of the connecting rod relative to the piston, a tube extending into said chamber, and a spring for urging one end of said tube into yieldable engagement with said piston pin to provide an unbroken conduit for cooling fluid into said chamber, said connecting rod having its upper portion cut away to permit oscillating movement of the connecting rod without affecting movement of said tube.

7. In a piston structure, a piston provided with a chamber for receiving cooling oil, a piston pin, a connecting rod, said piston pin and connecting rod provided with aligning bores for the passage of oil, means to maintain communication between the bores of the connecting rod and the piston pin upon movement of the connecting rod relative to the piston, a movable tube extending into said chamber and a spring engaging said tube for urging it into yieldable engagement with the piston pin.

In testimony whereof I affix my signature

JACOB H. CZOCK.